US005747908A

United States Patent [19]
Saneshige et al.

[11] Patent Number: 5,747,908
[45] Date of Patent: May 5, 1998

[54] MOTOR INCLUDING AN APPARATUS FOR MOUNTING A ROTOR AND STATOR COIL TO A PRINTED CIRCUIT BOARD

[75] Inventors: Ryoji Saneshige; Koji Kuyama, both of Yonago, Japan

[73] Assignee: Matsushita Electric Industrial Co., Ltd., Kadoma, Japan

[21] Appl. No.: 511,443

[22] Filed: Aug. 4, 1995

[30] Foreign Application Priority Data

Aug. 5, 1994 [JP] Japan .................. 6-184444

[51] Int. Cl.⁶ .................................................. H02K 5/00
[52] U.S. Cl. .................... 310/91; 310/90; 310/68 R; 310/254; 310/258; 310/67 R; 310/268
[58] Field of Search ......................... 310/91, 68 R, 310/268, 254, 258, 71, 90

[56] References Cited

U.S. PATENT DOCUMENTS

| Re. 34,001 | 7/1992 | Wrobel | 310/71 |
|---|---|---|---|
| 4,594,524 | 6/1986 | Sudo | 310/68 R |
| 4,673,834 | 6/1987 | Wrobel | 310/71 |
| 4,779,165 | 10/1988 | Elsaesser et al. | 360/96 |
| 4,800,307 | 1/1989 | Papst | 310/67 R |
| 4,931,679 | 6/1990 | Fournier | 310/71 |
| 5,006,943 | 4/1991 | Elsaesser et al. | 360/99.08 |
| 5,008,573 | 4/1991 | Beppu et al. | 310/67 R |
| 5,149,253 | 9/1992 | Miyamoto et al. | 417/353 |
| 5,173,628 | 12/1992 | Yoshida et al. | 310/71 |

FOREIGN PATENT DOCUMENTS

| 4-67754 | 3/1992 | Japan . |
|---|---|---|
| 4-67755 | 3/1992 | Japan . |
| 4-58078 | 5/1992 | Japan . |

*Primary Examiner*—Steven L. Stephan
*Assistant Examiner*—Elvin G. Enad
*Attorney, Agent, or Firm*—Wenderoth, Lind & Ponack

[57] ABSTRACT

A motor includes a stator core having a plurality of projected poles, a stator coil wound around an insulating portion of the stator core, a printed circuit board for supplying electricity to the stator coil, and a holder having a hollow projection and fixed to the stator core. The projection of the holder is inserted and fixed in a hole formed in the printed circuit board and is used for positioning and fixing the stator core. A portion of the projection of the holder has a hole. A terminal pin is fixed in the hole of the projection of the holder and has a step portion around which the stator coil is. The step portion is fixed to a solder land of the printed circuit board to be wired to the stator coil so as to make the terminal pin and the land electrically conductive.

15 Claims, 6 Drawing Sheets

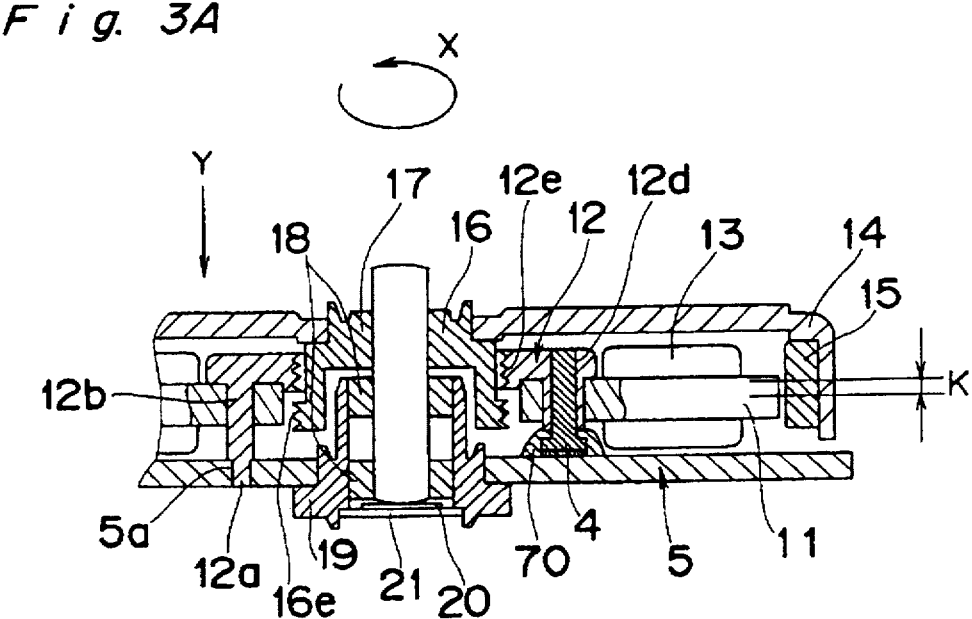
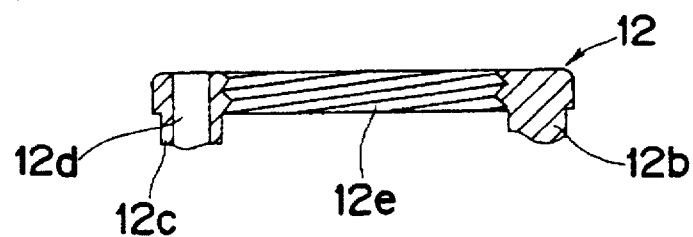
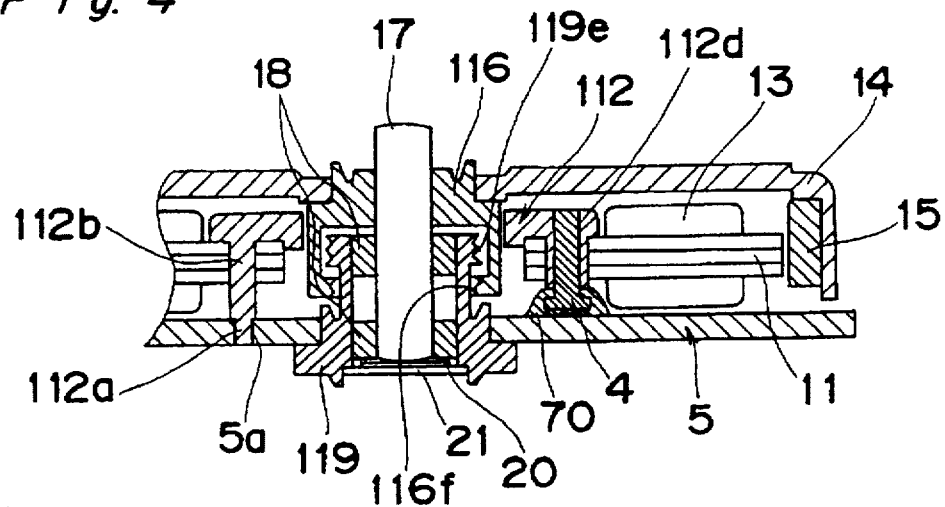

5,747,908

MOTOR INCLUDING AN APPARATUS FOR MOUNTING A ROTOR AND STATOR COIL TO A PRINTED CIRCUIT BOARD

BACKGROUND OF THE INVENTION

The present invention relates to a motor for use in office automation equipment and audio and video apparatus.

In recent years, with a demand for downsizing apparatus, there has been a growing demand for compacting and reducing the thickness of motors for use in such apparatuses.

A prior art motor will be described below.

FIGS. 8A and 8B are sectional views of a prior art motor. In FIGS. 8A and 8B, there are shown a stator core 101, an insulator 102, a stator coil 103 wound around the stator core 101 via the insulator 102, a printed circuit board 104 for wiring the stator coil 103, a bearing housing 105 fixed to the printed circuit board 104, bearings 106 which are fixed in the bearing housing 105 and operate to support a load in a radial direction X of a rotor secured to the bearing housing 105, a thrust cover 107 fixed to the bearing housing 105, a thrust plate 108 which is fixed to the bearing housing 105 by means of the thrust cover 107 and operates to receive a load in a thrust direction Y of the rotor, a rotor magnet 109 which is magnetized in a multipolar form and is arranged opposite to the stator core 101 circumferentially with interposition of a small gap, a rotor frame 110 to which the rotor magnet 109 is fixed, and a shaft 111 secured in a center portion of the rotor frame 110.

An operation of the motor having the above-mentioned construction will be described below.

First, when electricity is supplied to the printed circuit board 104, a current flows through the stator coil 103 soldered to a land of the printed circuit board 104 to generate a magnetic field, and consequently a torque is generated in conformity to a relation between the magnetic field and a magnetic flux of the rotor magnet 109. Since the shaft 111 is rotatably supported by the bearings 106, the rotor rotates. Further, the shaft 111 is put in stable contact with the thrust plate 108 taking advantage of a magnetic attraction force generated by displacing relative positions of the rotor magnet 109 and the stator core 101 in the axial direction, thereby preventing the possible vibration and movement in the axial direction of the rotor.

In the above-mentioned prior art construction, there is a method of providing solder between the stator core and the printed circuit board as a method of wiring by solder the stator coil to the printed circuit board. However, according to the above-mentioned method, it is required to provide a space which accepts insertion of a soldering iron therein, and this hinders the reduction in thickness of the motor. There is another method of providing a solder land on an outer peripheral side of the stator core, according to which method compact construction of the motor is prevented. Further, according to the method of limiting an amount of movement in the axial direction of the rotor taking advantage of a magnetic attraction force generated by displacing relative positions of the rotor magnet and the stator core in the axial direction, there is the possibility that the rotor may come out or the relevant apparatus may suffer damage when an excessive impact is applied.

SUMMARY OF THE INVENTION

Accordingly, an object of the present invention is to provide a motor capable of soldering a stator coil to a printed circuit board in a small space and concurrently limiting an amount of movement in the axial direction of a rotor.

In accomplishing these and other objects, according to one aspect of the present invention, there is provided a motor comprising:

- a stator core having a plurality of projected poles;
- a stator coil wound around an insulating portion of the stator core;
- a printed circuit board for supplying electricity to the stator coil;
- a holder having a hollow projection and fixed to the stator core, the projection of the holder being inserted and fixed in a hole which belongs to the printed circuit board and being used for positioning and fixing the stator core, a portion of the projection of the holder having a hole; and
- a terminal pin fixed into the hole of the projection of the holder and having a step portion around which the stator coil is wound, and being fixed to a solder land of the printed circuit board to be wired to the stator coil so as to make the terminal pin and the land electrically conductive.

BRIEF DESCRIPTION OF THE DRAWINGS

These and other aspects and features of the present invention will become clear from the following description taken in conjunction with the preferred embodiments thereof with reference to the accompanying drawings, in which:

FIG. 3A is a sectional view of a motor according to a third embodiment of the present invention;

FIG. 3B is a detailed view of a thread groove structure of a holder of the motor of the third embodiment of the present invention;

FIG. 4 is a sectional view of a motor according to a fourth embodiment of the present invention;

in FIG. 1;

DETAILED DESCRIPTION OF THE PREFERRED EMBODIMENTS

Figure 1A:
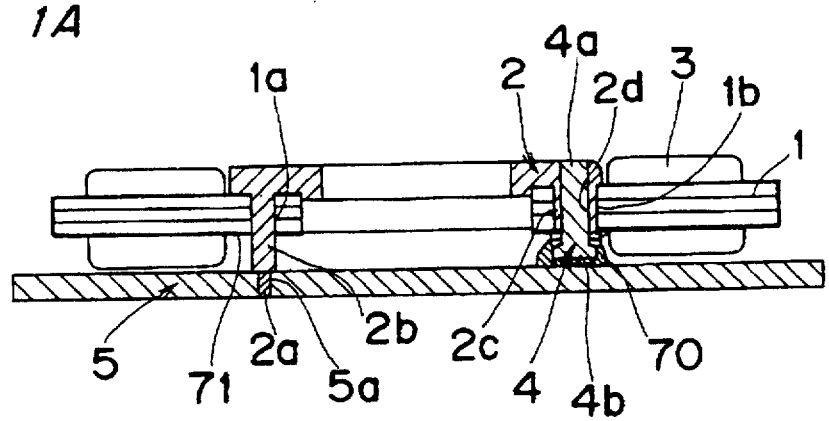
FIG. 1A is a sectional view of a stator section of a motor according to a first embodiment of the present invention.

Before the description of the present invention proceeds, it is to be noted that like parts are designated by like reference numerals throughout the accompanying drawings.

First embodiment

An embodiment of the present invention will be described with reference to the accompanying drawings.

Figure 1B:
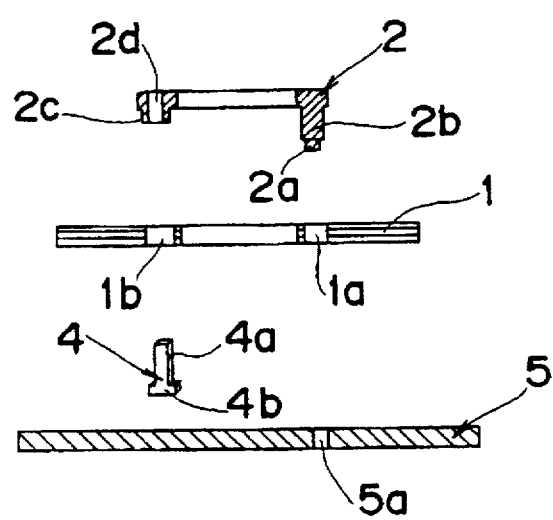
FIG. 1B is an assembly diagram of the stator section of the motor of the first embodiment of the present invention.

FIG. 1A is a sectional view of a stator section according to a first embodiment of the present invention, while FIG. 1B is an assembly diagram of the stator section of the first embodiment.

In FIGS. 1A and 1B, there are shown a stator core 1, a holder 2, a stator coil 3, a terminal pin 4, and a printed circuit board 5.

The stator core 1 is processed with electrodeposition coating to form an electrodeposition film 71 thereonto, while the stator coil 3 is wound around the stator core 1 and has its each end wound around the terminal pin 4, which is mounted to the holder 2, and fixed to the stator core 1. A projection 2a of a projected portion 2b of the holder 2 is inserted into a positioning hole 5a provided at the printed circuit board 5 via a hole 1a of the stator core 1 and fixed in the positioning hole 5a while a hollow projection 2c of the holder 2 is inserted into a hole 1b of the stator core 1 and the terminal pin 4 is inserted into a hole 2d of the hollow projection 2c inserted into the hole 1b of the stator core 1. Then, the terminal pin 4 is soldered to a land of the printed circuit board 5 as shown by 70.

An operation of the motor having the above-mentioned construction will be described below.

First, the plural holes 1a, 1b are provided at the stator core 1, and the plural projecting portions 2b, 2c of the holders 2 are press-fit and fixed in the holes 1a, 1b. In regard to the terminal pin 4, a portion 4a to be inserted in the hollow projection 2c of the holder 2 and a portion 4b around which the stator coil 3 is wound are constituted by a polygonal prism having three or more edges. With the above-mentioned arrangement, the terminal pin 4 expands the hole 2d of the hollow projection 2c of the holder 2, thereby allowing the stator core 1 and the holder 2 to have an increased strength against a force for pulling them out. Since the portion 4b of the terminal pin 4 has three or more edges and the center lines of the portion 4b and the hole 2d of the hollow projection 2c are aligned with each other, the portion 4b is stably positioned in the hole 2d of the hollow projection 2c. Further, by constituting a portion around which the stator coil 3 is wound by a polygonal prism having three or more edges, the stator coil 3 can be cut in a required length by means of the edges after the wire winding is completed. That is, the coil is pulled and cut by one edge of the three or more edges of the polygonal prism. If the polygonal prism has one or two edges, it is difficult to cut the coil with an edge. Further, the terminal pin 4 has a step structure with a rectangular plate-shaped step portion 4b which is thicker than a rectangular parallelopiped shaped portion 4a. Therefore, when the portion to be press-fit in the holder 2 and the portion around which the stator coil 3 is wound have step structures, the holder 2 and the terminal pin 4 can be easily aligned in position when the terminal pin 4 is press-fit in the holder 2, so that possible displacement of the terminal pin 4 can be prevented when soldering of the pin 4 is effected. As shown in FIGS. 9, 10A, 10B, and 10C, the rectangular parallelopiped shaped portion 4a of the terminal pin 4 to be soldered to the land 5g of the printed circuit board 5 has a diameter C of an inscribed circle 4i of the rectangular parallelopiped shaped portion 4a. The diameter C is smaller than an outer dimension B of the wound stator coil 3. Also, a diameter A of a circumscribed circle 4j of the rectangular plate-shaped step portion 4b is greater than the outer dimension B of the wound stator coil 3. The outer dimension B is equal to the diameter C of a inscribed circle 4i of the rectangular parallelopiped shaped portion 4a plus two times the outer diameter of the coil 3c of the stator coil 3. The reason why the diameter C of the inscribed circle 4i of the rectangular parallelopiped shaped portion 4a is smaller than the outer dimension B of the stator coil 3 wound around the rectangular parallelopiped shaped portion 4a is to prevent the coil 3c from slipping off from the rectangular parallelopiped shaped portion 4a. The reason why the diameter A of the circumscribed circle 4j is greater than the outer dimension B of the stator coil 3 is to easily raise the solder from the land side of the printed circuit board 5 and fix the coil 3c to the terminal pin 4 and the land 5g with the solder 70. With the above-mentioned arrangement, the stator coil 3 is prevented from being disconnected from the terminal pin 4 when the stator coil 3, wound around the stator core 1, is wound around the pin 4. Furthermore, solder easily permeates from the land 5c of the printed circuit board 5 up to the stator coil 3 when the terminal pin 4 is soldered to the printed circuit board 5 as shown by 70, so that the stator coil 3 and the printed circuit board 5 can be securely soldered to each other. Additionally, since the stator core 1 is processed with electrodeposition coating to form the electrodeposition film 71 thereonto, the thickness of the electrodeposition film 71 may be 0.025 to 0.1 mm so as to reduce the thickness of the motor. An insulating member made of insulating resin is used for insulation, and the thickness of the insulating member is 0.1 mm or more which is larger than the thickness of the film 71.

The portion to be inserted in the hollow projection 2c of the holder 2 may also be constituted by a cylindrical column.

Second embodiment

A second embodiment of the present invention will be described with reference to the accompanying drawings.

Figure 2:
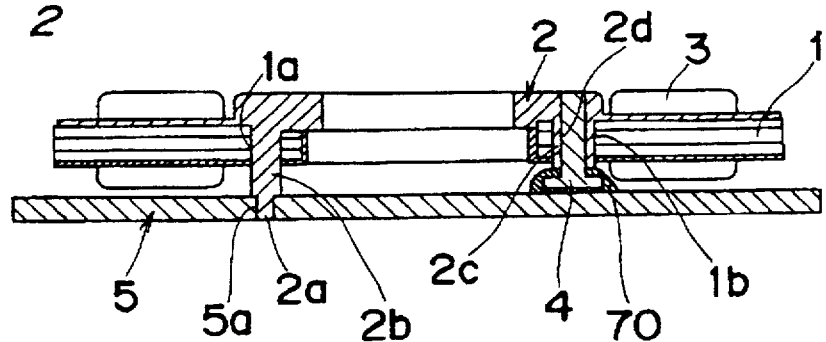
FIG. 2 is a sectional view of a stator section of a motor according to a second embodiment of the present invention.

FIG. 2 is a sectional view of a stator section of the second embodiment of the present invention.

In FIG. 2, there are shown a stator core 1, a stator coil 3, a terminal pin 4, and a printed circuit board 5. The above-mentioned components are the same as those shown in FIG. 1. The present embodiment differs from the structure of FIG. 1 in that the holder 2 has an insulator function. That is, the holder 2 is made of insulating material such as nylon and covers the upper surface of the stator core 1.

The operation of a motor having the above-mentioned construction is as follows.

The operation of the present embodiment is quite the same as that of the first embodiment. By virtue of the arrangement that the holder 2 has an insulator function, a simplified structure is achieved to allow the assembling processes to be reduced in number because the holder 2 is made of insulating material and thus it is unnecessary to add or attach an insulating coating or member to the holder 12.

Third embodiment

A third embodiment of the present invention will be described with reference to the accompanying drawings.

FIG. 3A is a sectional view of a motor of the third embodiment of the present invention, while FIG. 3B is a detailed view of a thread groove structure of a holder of the third embodiment of the present invention.

Figure 11A:
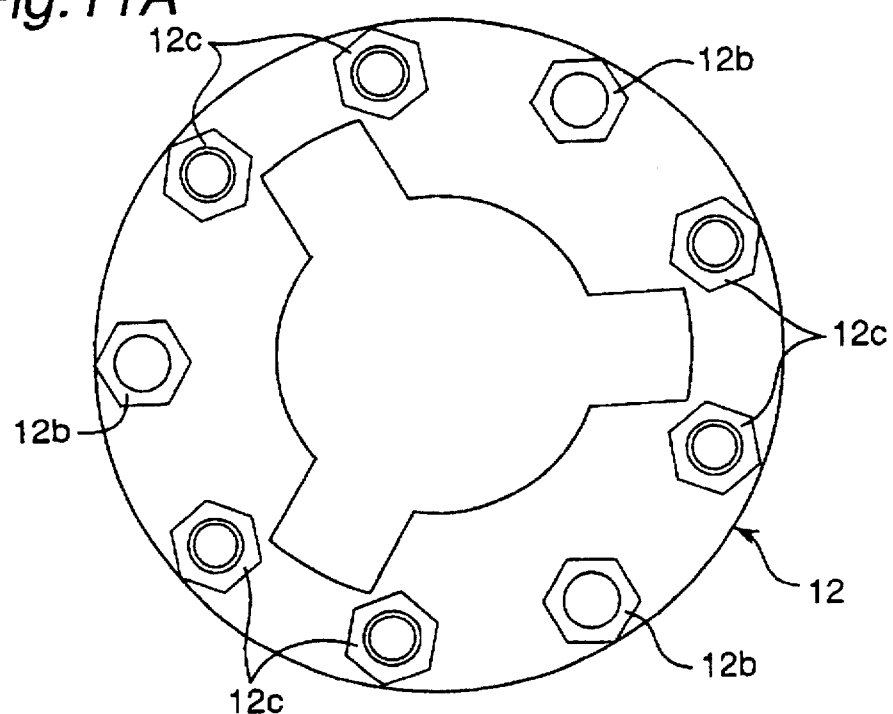
FIGS. 11A and 11B are a plan view and a sectional side view of a holder of FIG. 3A.
Figure 11B:
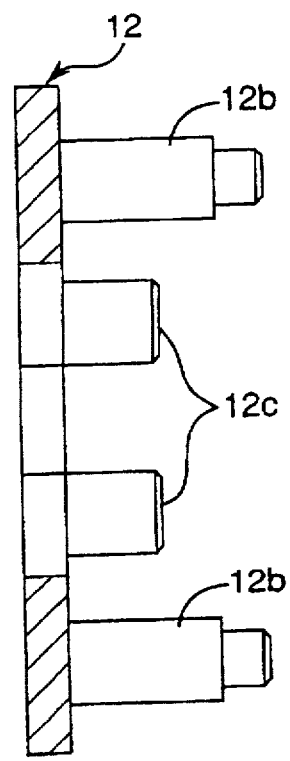

In FIGS. 3A and 3B, there are shown a stator core 11, a holder 12, a stator coil 13, a rotor frame 14, a rotor magnet 15, a stop block 16 serving as a limiting means for limiting an amount of movement in an axial direction of the rotor, a shaft 17, bearings 18, a bearing housing 19, a thrust plate 20, and a thrust cover 21. The stator core 11 and the holder 12 correspond to the stator core 1 and the holder 2, respectively. Then, a projection 12a, a projected portion 12b, a hollow projection 12c, and a hole 12d of the holder 12 correspond to the projection 2a, the projected portion 2b, the hollow projection 2c, and the hole 2d of the holder 2. As show in FIGS. 11A and 11B, the holder 12 has six hollow projections 12c and three projected portions 12b with the projections 12a. The rotor frame 14 is arranged circumferentially opposite to the stator core 11 with interposition of a small gap such as 0.05 through 0.4 mm and magnetized in a multipolar form and has the rotor magnet 15.

The holder 12 is fixed to the stator core 11, and the stator coil 13 is wound around the stator core 11 via an insulating portion. The rotor magnet 15 are fixed to the rotor frame 14, and further the stop block 16 is fixed to the rotor frame 14. The shaft 17 is press-fit and fixed in the stop block 16. The shaft 17 is rotatably supported by the bearings 18 fixed in the bearing housing 19 with its load in a radial direction X received on the bearings 18. Meanwhile, a load in a thrust direction Y is received on the thrust plate 20, fixed to the bearing housing 19 via the thrust cover 21.

The operation of a motor having the above-mentioned construction will be described below.

First, relative positions in the axial direction of the rotor magnet 15 and the stator core 11 are arranged as displaced by a dimension K from a neutral point of a magnetic attraction force. With the above-mentioned arrangement, a magnetic attraction force in the thrust direction Y is generated to stabilize the axial position of the rotor. The stop block 16, fixed to the rotor frame 14, is provided with a thread groove 16e, while a thread groove 12e to be screwed in the thread groove 16e of the stop block 16 is provided at the holder 12 fixed to the stator core 11. In an assembling process, the stop block 16 is turned to be screwed into position. Through the above-mentioned assembling process, the amount of movement in the axial direction of the rotor can be limited. Since a magnetic thrust force is generated in the Y-direction by the magnetic attraction force in the axial direction, the rotor will not come off if the rotor is turned in a direction counter to the direction in which the rotor is turned when inserted. That is, the thread groove 12e of the holder 12 is screwed in the thread groove 16e of the stop block 16 and the portion where the thread groove 16e is formed is penetrated through the portion where the thread groove 12e is formed to position the former portion inside the latter portion, i.e. below the latter portion in FIG. 3A. Thus, even though an external force to upwardly move the rotor in FIG. 3A is applied to the rotor, the stop block 16 which is fixed to the rotor frame 14 of the rotor limits the amount of movement in the axial direction of the rotor.

Fourth embodiment

A fourth embodiment of the present invention will be described with reference to the accompanying drawings.

FIG. 4 is a sectional view of a motor of the fourth embodiment of the present invention.

In FIG. 4, there are shown a stator core 11, a holder 112, a stator coil 13, a rotor frame 14, a rotor magnet 15, a stop block 116 serving as a limiting means for limiting movement in an axial direction of a rotor, a shaft 17, bearings 18, a bearing housing 119, a thrust plate 20, and a thrust cover 21. The above-mentioned construction is the same as that of FIGS. 3A and 3B. The present embodiment differs from the construction of FIGS. 3A and 3B in that a thread groove 119e is provided around the outer surface of bearing housing 119 instead of the thread groove 112e provided on the inner peripheral surface of the holder 112, and a thread groove 116f is provided on an inner peripheral surface of the stop block 116 instead of the thread groove 16e provided on the outer peripheral surface of the stop block 16. A projection 112a, a projected portion 112b, a hollow projection 112c, and a hole 112d of the holder 112 correspond to the projection 2a, the projected portion 2b, the hollow projection 2c, and the hole 2d of the holder 2.

An operation of the motor having the above-mentioned construction is as follows.

The operation of the present embodiment is quite the same as that of the third embodiment. The amount of movement in the axial direction of the rotor can be limited by similar construction to the third embodiment, so that the rotor can be prevented from disengaging.

Fifth embodiment

A fifth embodiment of the present invention will be described with reference to the accompanying drawings.

Figure 5:
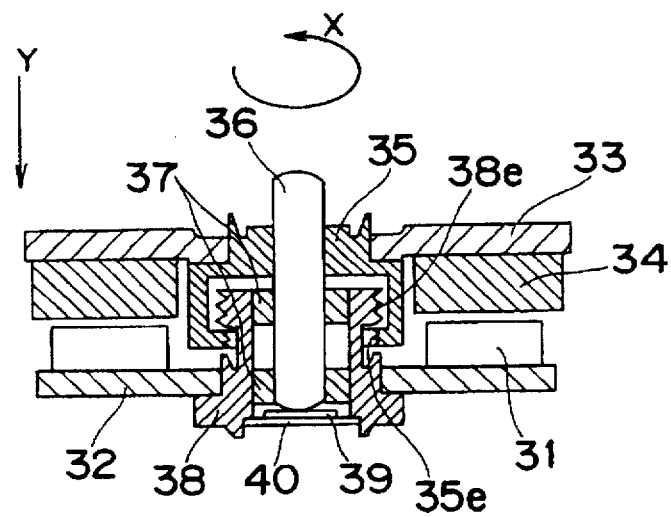
FIG. 5 is a sectional view of a motor according to a fifth embodiment of the present invention.

FIG. 5 is a sectional view of a motor of the fifth embodiment of the present invention.

In FIG. 5, there are shown a stator coil 31, a base 32, a rotor frame 33, a rotor magnet 34, a stop block 35 serving as a limiting means for limiting an amount of movement in an axial direction of a rotor, a shaft 36, bearings 37, a bearing housing 38, a thrust plate 39, and a thrust cover 40.

The stator coil 31 is wired to the base 32. The rotor magnet 34 annularly magnetized in a multipolar form is fixed to the rotor frame 33, and further the stop block 35 is fixed to the rotor frame 33. The shaft 36 is press-fit and fixed in the stop block 35. The shaft 36 is rotatably supported by the bearings 37 fixed in the bearing housing 38 with its load in a radial direction X received on the bearings 37. Meanwhile, a load in a thrust direction Y is received on the thrust plate 39 fixed to the bearing housing 38 via the thrust cover 40.

The operation of a motor having the above-mentioned construction is as follows.

First, an axial position of the rotor is stabilized by a magnetic attraction force exerted between the rotor magnet 34 and the base 32. The stop block 35 fixed to the rotor frame 33 is provided with a thread groove 35e, while a thread groove 38e to be screwed in the thread groove 35e of the stop block 35 is provided at the bearing housing 38. In an assembling process, the stop block 35 is turned to be screwed into position. Through the above-mentioned assembling process, the amount of movement in the axial direction of the rotor can be limited by a construction similar to the third embodiment. Since a magnetic thrust force is generated in the Y-direction by a magnetic attraction force in the axial direction, the rotor will not disengage if the rotor is turned in a direction counter to the direction in which the rotor is turned upon assembly.

It is to be noted that each thread groove provided at the holder, the stop block, and the bearing housing in the fourth and fifth embodiments may be of course implemented by a continuous groove or discontinuous grooves. When the thread groove is discontinued and is made of resin, molds for molding the thread groove with resin may be easily manufactured because it is unnecessary to take into consideration the rotation of the molds in taking out the moldings having the thread groove from the molds and the construction of the molds may be simple.

Sixth embodiment

A sixth embodiment of the present invention will be described with reference to the accompanying drawings.

Figure 6A:
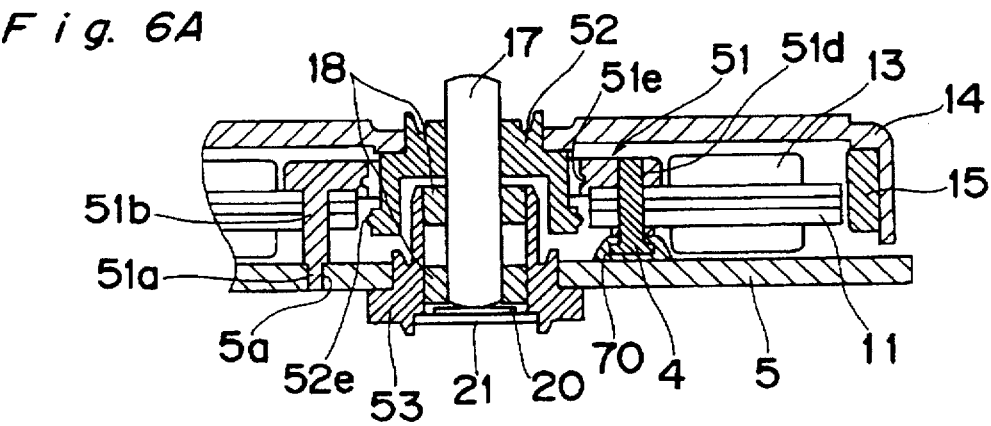
FIG. 6A is a sectional view of a motor according to a sixth embodiment of the present invention.
Figure 6B:
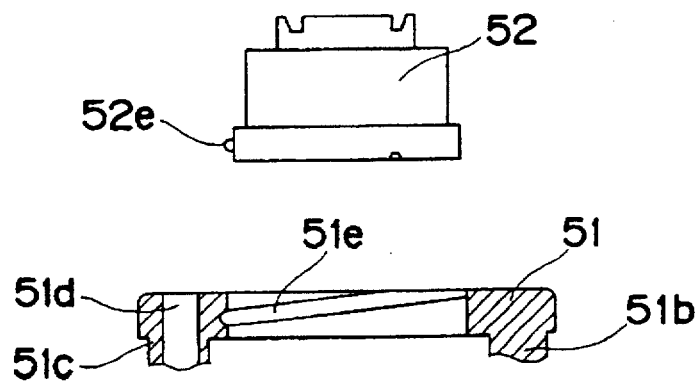
FIG. 6B is a detailed view of a holder and a stop block of the motor of the sixth embodiment of the present invention.

FIG. 6A is a sectional view of a motor of the sixth embodiment of the present invention, while FIG. 6B is a detailed view of a holder and a stop block of the motor of the sixth embodiment of the present invention.

In FIGS. 6A and 6B, there are shown a holder 51, a stop block 52 serving as a limiting means for limiting movement in an axial direction of a rotor, and a bearing housing 53. The above-mentioned construction is the same as in FIGS. 3A, 3B, 4, and 5. The present embodiment differs from the constructions of FIGS. 3A, 3B, 4, and 5 in that one or more semispheric projection 52e and a groove 51e are provided in place of the thread grooves provided at the holder, the stop block, or the bearing housing. That is, the semispheric projection 52e is provided on the outer peripheral surface of the stop block 52 and the groove 51e for engaging the semispheric projection 52e thereinto is provided on the inner surface of a hole of the holder 51. A projection 51a, a projected portion 51b, a hollow projection 51c, and a hole 51d of the holder 51 correspond to the projection 2a, the projected portion 2b, the hollow projection 2c, and the hole 2d of the holder 2.

An operation of the motor having the above-mentioned construction is as follows.

The operation of the present embodiment is quite the same as those of the third, fourth, and fifth embodiments. The amount of movement in the axial direction of the rotor can be limited with a simple construction of components, so that the rotor can be prevented from coming out.

Seventh embodiment

A seventh embodiment of the present invention will be described with reference to the accompanying drawings.

Figure 7:
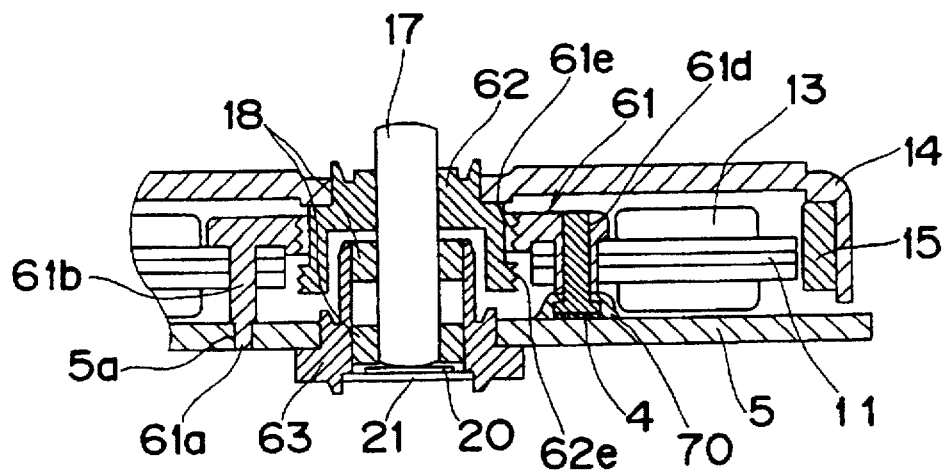
FIG. 7 is a sectional view of a motor according to a seventh embodiment of the present invention.
Figure 8A:
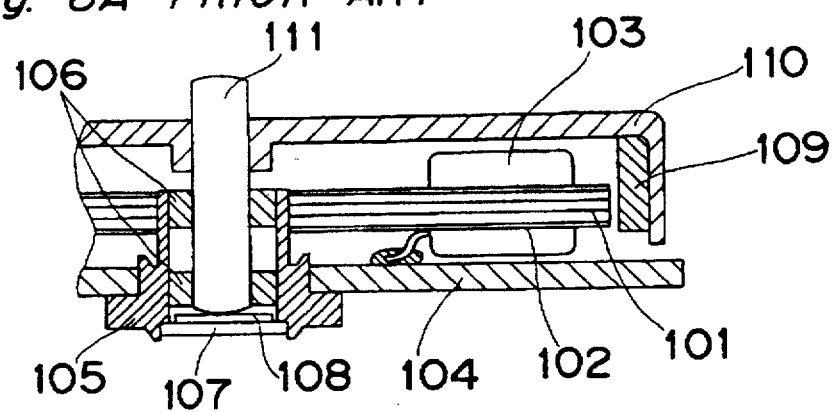
FIG. 8A is a sectional view of a prior art motor.
Figure 8B:
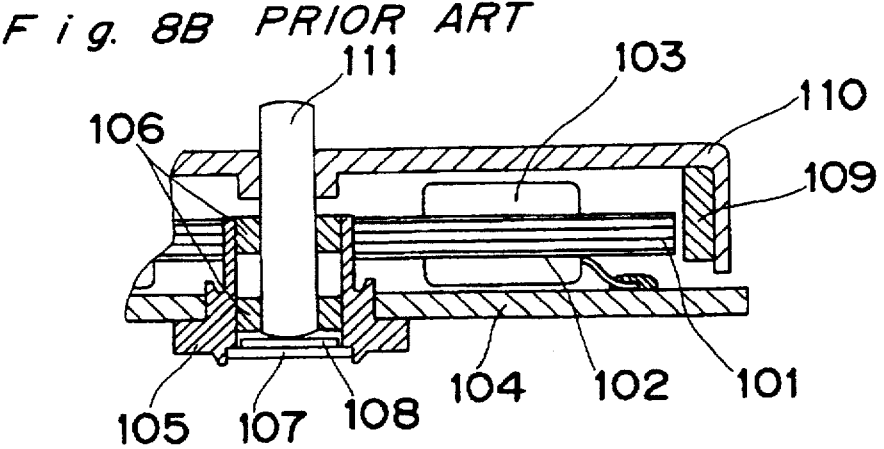
FIG. 8B is a sectional view of a prior art motor.
Figure 9:
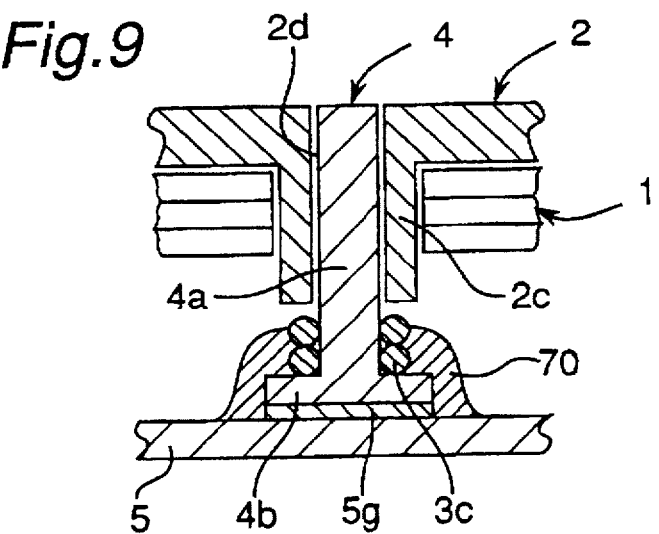
FIG. 9 is an enlarged view showing a terminal pin, solder etc.
Figure 10A:
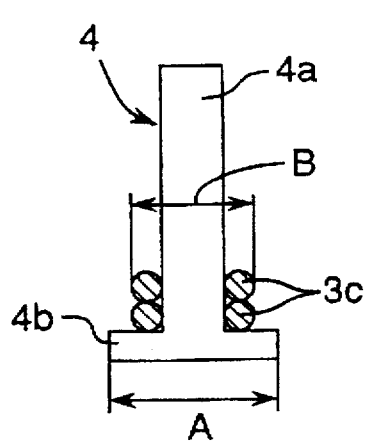
FIGS. 10A, 10B, and 10C are a front view, a side view, and a plan view of the terminal pin.
Figure 10B:
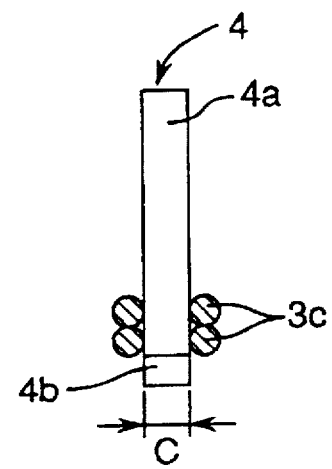
Figure 10C:
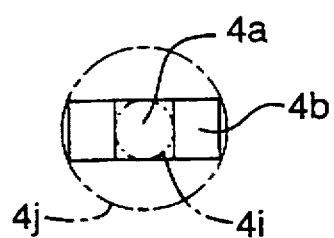

FIG. 7 is a sectional view of a motor of the seventh embodiment of the present invention.

In FIG. 7, there are shown a holder 61, a stop lock 62 serving as a limiting means for limiting movement in an axial direction of a rotor, and a bearing housing 63. The above-mentioned construction is the same as those of FIGS. 3A, 3B, 4, and 5. The present embodiment differs from the constructions of FIGS. 3A, 3B, 4, and 5 in that a thread groove having a self-tapping function is provided at any of the holder 61, the stop block 62, and the bearing housing 63. For example, when the thread groove 62e having a self-tapping function is provided at the stop block 62, the stop block 62 is turned to be screwed into the holder 61 to form a thread groove 61e on its inner surface of a hole of the holder 61.

An operation of the motor having the above-mentioned construction is as follows.

The operation of the present embodiment is quite the same as those of the third, fourth, and fifth embodiments. Any of the holder 61, the stop block 62, and the bearing housing 63 is made to have a self-tapping function, i.e., a function for tapping a thread on a counterpart component when each component is inserted into the counterpart component. With the above-mentioned arrangement, the components constituting the thread grooves are reduced in number, and the amount of movement in the axial direction of the rotor can be limited, so that the rotor can be prevented from coming out.

According to the present invention as described above, the terminal pin around which the stator coil is wound is fixed to the holder fixed to the stator core, and the terminal pin is allowed to be soldered to the land of the printed circuit board in the small gap between the stator core and the printed circuit board by reflow or local heating. With the above-mentioned arrangement, the motor can be compacted and reduced in thickness, and reduction in number of assembling processes can be achieved. Furthermore, by providing the stop block having a thread groove at the rotor frame, and providing a thread groove to be screwed in the thread groove of the stop block at the holder or the bearing section, the amount of movement in the axial direction of the rotor can be limited with a simple construction, so that the rotor can be prevented from coming out.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A motor comprising:
   a stator core having an insulating portion;
   a stator coil wound around said insulating portion of said stator core;
   a printed circuit board for supplying electricity to said stator coil, said printed circuit board including a hole and a solder land;
   a holder, connected to said stator core, having a first projection and a second projection,
   wherein said first projection is hollow and extends through a first through hole formed in said stator core, and said second projection extends through a second through hole formed in said stator core and into said hole formed in said printed circuit board so as to position and fix said stator core relative to said printed circuit board; and
   a terminal pin having a portion which is inserted into said hollow first projection of said holder, a portion around which said stator coil is wound, and a step portion fixed to said solder land of said printed circuit board so that said terminal pin and said solder land are electrically conductive.

2. The motor as claimed in claim 1, wherein:
   said portion of said terminal pin, inserted into said hollow first projection, is formed as a cylindrical column or a polygonal prism having at least three edges; and
   said portion of said terminal pin, about which said stator coil is wound, is formed as a polygonal prism having at least three edges.

3. The motor as claimed in claim 1, wherein said step portion of said terminal pin has an inscribed circle having a diameter which is smaller than an outer diameter of said wound stator coil and a circumscribed circle having a diameter which is greater than said outer diameter of said wound stator coil.

4. The motor as claimed in claim 1, wherein said stator core is processed with an electrodeposition coating.

5. The motor as claimed in claim 1, wherein said holder acts as an insulator relative to said stator coil.

6. A motor comprising:
   a stator core;
   a holder fixed to said stator core;
   a stator coil wound around said stator core via an insulating portion;
   a rotor including a rotor shaft, a rotor frame mounted on said rotor shaft, and a rotor magnet supported in said rotor frame, wherein said rotor magnet is magnetized in a multipolar form and is disposed circumferentially opposite to said stator core and is spaced therefrom by a gap;
   a bearing assembly for rotatably supporting said rotor shaft such that said rotor has an axial position which is stabilized by a magnetic attraction force generated by axially displacing said rotor magnet relative to said stator coil; and
   a limiting means, provided at said rotor frame, for limiting axial movement of said rotor, said limiting means having a first thread groove, wherein said bearing assembly or said holder has a second thread groove which is screwed into said first thread groove of said limiting means during assembly of said motor.

7. The motor as claimed in claim 6, wherein said first thread groove of said limiting means is formed as a continuous groove.

8. The motor as claimed in claim 6, wherein said first thread groove of said limiting means is formed as a discontinuous groove.

9. The motor as claimed in claim 6, wherein one of said first and second thread grooves comprises a semispherical projection and the other of said first and second thread grooves comprises a recess for receiving said semispherical projection.

10. The motor as claimed in claim 6, wherein one of said first and second thread grooves has a self-tapping function for forming the other of said first and second thread grooves.

11. A motor comprising:

a base;

a plurality of stator coils fixed to said base;

a bearing assembly fixed to said base and having a first thread groove;

a rotor rotatably supported by said bearing assembly;

a ring-shaped rotor magnet fixed to said rotor, said rotor magnet being arranged axially opposite to said plurality of stator coils and spaced therefrom by a gap, wherein said magnet is magnetized in a multipolar form and said rotor is stabilized in an axial position by a magnetic attraction force between said base and said rotor magnet; and a limiting means, provided at said rotor, for limiting axial movement of said rotor, said limiting means having a second thread groove which engages said thread groove of said bearing assembly upon rotating said rotor relative to said bearing assembly during assembly of said motor.

12. The motor as claimed in claim 11, wherein said thread groove of said limiting means comprises a continuous groove.

13. The motor as claimed in claim 11, wherein said thread groove of said limiting means comprises a discontinuous groove.

14. The motor as claimed in claim 11, wherein one of said first and second thread grooves comprises a semispherical projection and the other of said first and second thread grooves comprises a recess for receiving said semispherical projection.

15. The motor as claimed in claim 11, wherein one of said first and second thread grooves has a self-tapping function for forming the other of said first and second thread grooves during assembly of said motor.

* * * * *